Oct. 16, 1956     B. NEWMAN     2,767,308

LAMP STRUCTURES

Filed Aug. 13, 1953     2 Sheets-Sheet 1

INVENTOR.
BEAR NEWMAN
BY Henry L. Burkitt
ATTORNEY

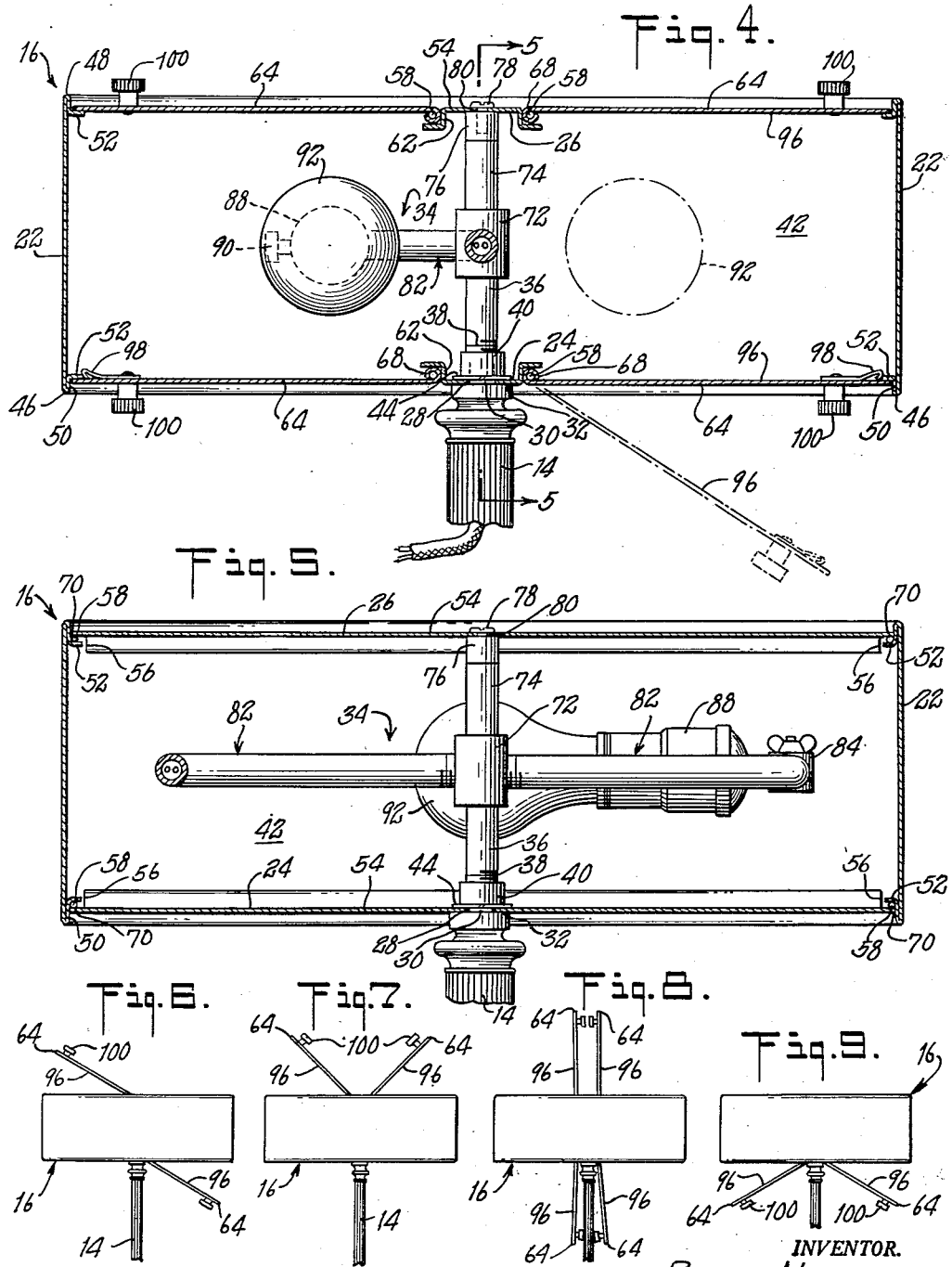

United States Patent Office 2,767,308
Patented Oct. 16, 1956

2,767,308

LAMP STRUCTURES

Bear Newman, New Milford, Conn.

Application August 13, 1953, Serial No. 374,061

2 Claims. (Cl. 240—81)

This invention relates to lamp structure.

In the usual type of lamp structure, where a shade is provided, the direction as well as the quantity of light from the source within the shade generally is fixed. In most cases, that direction is fixed in relation to some ornamental aspect which is desired; the functional factors are minimized. When the lamp is on, all must bear with it; otherwise, there is light for no one.

It is an object of the invention to provide a lamp structure by which the amount as well as the direction of illumination derived from a source within the lamp structure may be controlled.

By certain lamp structures, so-called indirect lighting is sought. In some such cases, light rays are directed toward a ceiling of a room; the rays then are reflected and diffused throughout the room. In certain instances, the light rays from the source are prevented from moving directly downwardly; in others, some of the rays are permitted direct downward movement through a translucent member or globe. In any of these instances, the amount and direction of light from the light source is fixed.

It is an object of the invention to provide a device which is capable of functioning selectively to effect indirect lighting, or direct lighting, or a combination of them, as desired. The lamp structure of the invention may be made effective to control amount as well as the direction of the light rays.

Other objects of the invention will be set forth hereinafter, or will be apparent from the description and the drawings, in which is illustrated an embodiment exemplifying the invention.

The invention, however, is not intended to be restricted to any particular construction, or any particular arrangement of parts, or any particular application of any such construction or arrangement of parts, or any specific method of operation or use, or any of the various details thereof, even where specifically shown and described herein, as the same may be modified in various particulars, or may be applied in many varied relations, without departing from the spirit and scope of the claimed invention, of which the exemplifying embodiment, herein shown and described, is intended only to be illustrative, and only for the purpose of complying with the requirements of the statutes for disclosure of an operative embodiment, but not to show all the various forms and modifications in which the invention might be embodied.

On the drawings, in which the same reference characters refer to the same parts throughout, and in which is disclosed such a practical construction, Fig. 1 is an elevational perspective view of a floor lamp embodying features of the invention, one of the light controlling wing elements of the lamp structure being shown in a partially opened position;

Fig. 4 is a vertical cross-sectional view, substantially on the line 4—4 of Fig. 3, and to larger scale, part of the lamp structure being broken away, and one of the control members being shown, in dot-and-dash lines, swung to another operating position;

Fig. 5 is a vertical transverse cross-sectional view substantially on the line 5—5 of Fig. 4, certain of the parts being shown in elevation; and Figs. 6, 7, 8, and 9 are elevational views, to substantially reduced scale, to provide examples of various possible relations of the controlling members of the lamp structure.

Figure 1:
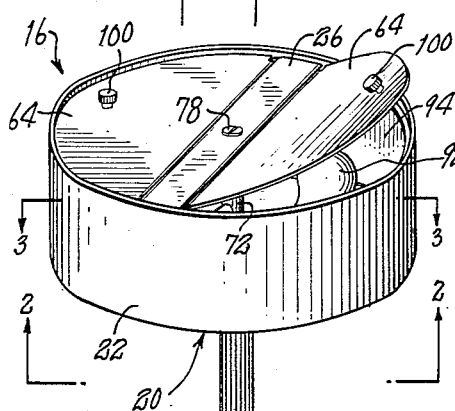
Figure 2:
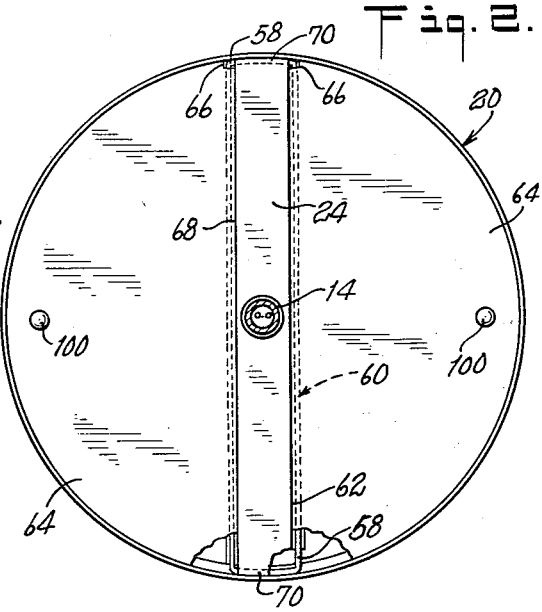
Fig. 2 is a bottom plan sectional view, substantially on the line 2—2 of Fig. 1, to somewhat enlarged scale.
Figure 3:
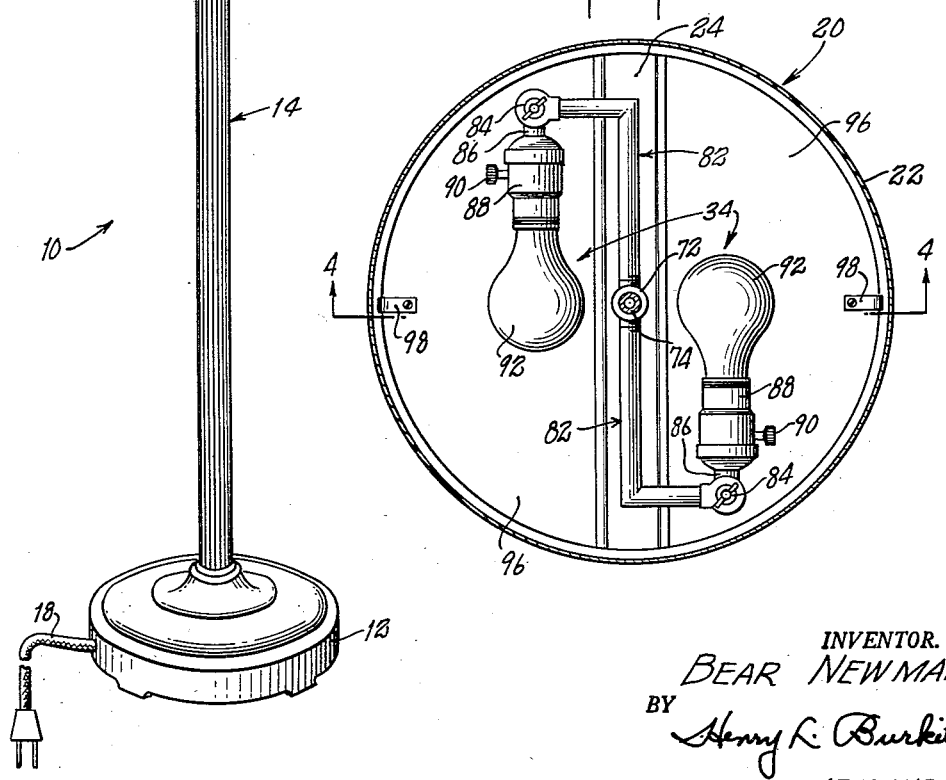
Fig. 3 is a transverse, cross-sectional view, substantially on the line 3—3 of Fig. 1, to substantially the same scale as Fig. 2.

On the drawings, a lamp structure 10 is depicted in the form of a floor lamp. This, however, is only for purposes of illustration as the features of the invention may have application in other associations. Structure 10 is here shown as having a conventional base 12 from which extends a standard 14; at the top of the standard is positioned element 16. Conductors 18 may be led through base 12 and standard 14 to element 16.

Element 16 is shown as a cylindrical member 20 again for facility in illustration. The element may take such other form as will make possible the utilization of certain features here to be considered. In the structure illustrated, the cylindrical walls 22 of element 16 are held distended in that form by a pair of crossbraces 24 and 26. An opening 28 may be provided in cross-brace 24 through which opening a nipple 30, forming the terminus of standard 14, may project. Nipple 30 may be provided with a shoulder 32 upon which crossbrace 24 may rest.

A lamp assembly 34 may be formed from a number of tubular members; one member 36 may have a threaded end 38. A coupling 40 may be engaged on end 38, and may also engage the end of nipple 30 which extends through opening 28 into space 42 within element 16 and is threaded for that purpose. A spring washer 44 may be assembled over the threaded end of nipple 30 between coupling 40 and the inside face of crossbrace 24. In this manner, crossbrace 24 is securely anchored to standard 14, and element 16 is secured firmly upon the standard.

Walls 22 of member 20 may be formed from sheet metal. For this purpose, it may be desirable first to roll edges 46 and 48 of the sheet material inwardly, before other forming operations, to provide a reverse bend 50. Beyond the reverse bend, the sheet metal is bent at right angles to form a ledge 52. Thus, reinforcement of each of edges 46 and 48 is effected.

Each of cross-braces 24 and 26 may be formed from a flat strip 54 of metal long enough to extend diametrically across member 20, and wide enough to provide sufficient metal for engagement of washer 44 and its associated elements. The strip of metal is cut away at 56, and then is bent first downwardly and then outwardly (Fig. 4).

A wire 58 of sufficient cross-section to give it rigidity in its final form is bent to define a rectangular loop 60 which is dimensioned exactly to conform to the outside bounds of the vertical faces 62 of bent strip 54.

A number of wings 64 may be formed, and may be shaped in any suitable form according to any determined design. For instance, the wings may take the semicircular form indicated, which may be produced from material such as sheet metal, stamped, cut or otherwise formed; cutouts 66 may be provided, forming an end flap 68. This end flap is curled around and tightly pressed into engagement with wire 58. Sufficient friction is thus created that, although wing 64 may be rotated on wire 58 as a pivot, to position the wing at any desired angular position, yet the wing will be retained in the position to which it has been adjusted by reason of that friction.

After the wings have been assembled on wire 58, the assembly is positioned upon the particular cross-brace 24 or 26, so that the wire conforms closely to faces 62; at the cut away portions 56, wire 58 straddles and rests upon ledge 52. When rectangular loop 60 is positioned on ledge 52, and properly associated with strip 54, spot welding may be utilized to bond points of the wire and of piece 70 left extending from strip 54 by cut away portions 56 to ledge 52.

Lamp assembly 34, in addition to member 36 and coupling 40, may include a cross 72 which may be united with member 36 in any manner desired. Above cross 72 is another member 74 similar to member 36 and united with cross 72 in substantially the same manner. Finally, member 74 may be engaged by a separate cap 76, or cap 76 may be formed as a part of member 74. Provision may be made in the cap for the reception of a screw 78, which may be extended through an opening 80 in crossbrace 26. By this method of construction, the two braces 24 and 26 may be rigidified with relation to each other, and thus rigidify element 16.

Extending from cross 72 may be a pair of angularly shaped tubular members 82 at the end of each of which an adjustable pivot 84 may be associated. Carried by one arm 86 of pivot 84 is a socket 88 having usual switching means 90 for a light bulb 92 to be retained in the socket. Wiring for the sockets may be passed through standard 14, through coupling 40, member 36, cross 72, angular members 82, adjustable pivots 84, arms 86, and sockets 88, to energize bulbs 92. The position of bulbs 92 with relation to the openings 94 may be adjusted by means of movement of arms 86 around pivots 84.

Now when the lamp structure has been assembled, and power is being supplied to bulbs 92, all of the wings 64 may be pivoted to the positions where they are fully closed, as shown for the bottom wings of Fig. 7 and the top wings of Fig. 9. In such relationship, no light at all will pass to the outside of the lamp structure.

Such light as is desired may be controlled as to its direction by opening any selected one or more of the particular wings; the opening may be to such degree as desired. For instance, as shown in Fig. 6, persons sitting on opposite sides of the lamp may desire different degrees of illumination. For that reason, one person may open that lower wing closely proximate to him, while another person may desire another wing to be opened upwardly, to provide some diffused lighting in his direction. As shown in Fig. 7, the parties may desire only limited lateral and downward illumination, but not direct downward illumination. In such case, the wings may be opened to point upwardly at an acute angle. Light rays passing through openings 94 will be reflected from the wings, the inside faces of which may be provided with means, such as suitable enamel or paint, to serve as a reflecting face. The light will then be directed, as can be understood, away from the lamp body; very little will pass upwardly.

When it is desired that light be directed both downwardly and upwardly, the wings may be positioned as shown in Fig. 8, in which case the light from sources within the lamp will go both directly upwardly and directly downwardly. Some light will be reflected laterally from faces 96 of the wings.

When it is desired to have light sidewise, the arrangement of Fig. 9 may be utilized. In such case, the top wings will be closed, but the bottom wings will be partially open. Light will be reflected outwardly away from the lamp.

In a case where one person desires to sleep, and another person desires to have illumination, as for reading, all but one of the wings may be closed; that one may be opened slightly downwardly, so that the illumination derived from that particular opening will be reflected toward the person desiring light, and away from the person not desiring illumination at that time.

Likewise, it may be desirable to have only indirect lighting. In such case, the top wings of the lamp may be opened, while the bottom wings are retained closed.

Although the friction of the wings on the wires may be sufficient, it may be desired to have securing means to retain the bottom wings against moving downwardly. Each of the bottom wings may carry a small bent spring 98 which may be bent to provide a prong to engage against ledge 52 (Fig. 4). Knobs 100 may be provided for the manipulation of each wing.

Many other changes may be effected in the particular constructions, and in the methods of use and construction, and in specific details thereof, hereinbefore set forth, without substantially departing from the invention intended to be defined herein, the specific description being merely of an embodiment capable of illustrating certain principles of the invention.

What is claimed as new and useful is:

1. An illumination device comprising a hollow casing having opposed top and bottom openings and having a free path for the passage of light between said openings, light emission means mounted in said casing intermediate said top and bottom openings and adapted to emit light through said openings simultaneously, vanes respectively hinged to the top and bottom of said casing and being individually adjustable in position relative thereto, the hinge line of each vane being laterally offset relative to said source of light, said vanes being respectively shaped and adapted to substantially completely cover the respective top and bottom openings, the inner surfaces of said vanes being reflecting surfaces, said vanes being respectively adjustable upon their hinges to desired angular positions relative to said openings so as to be outwardly inclined relative to said openings and to only partially overlie said openings, whereby it is possible to control the amount of light emitted through said openings as well as the direction in which said emitted light is transmitted from said device.

2. An illumination device comprising a hollow casing in the form of a cylindrical drum having opposed top and bottom openings, diametrically extending crosspieces fixed to said casing at the respective top and bottom openings thereof, said cross-pieces being parallel to each other, a pair of light sources mounted within said casing intermediate its top and bottom openings and respectively located on opposite sides of said cross-pieces so that light can pass freely in a generally vertical direction from each of said light sources to the respective top and bottom openings of said casing, a pair of top vanes hingedly connected to the opposite side edges of the top cross-piece, and a pair of bottom vanes hingedly connected to the opposite side edges of the bottom crosspiece, the hinge connections of said vanes being located laterally inwardly of the respective light sources, the hinge connections being such so as to permit individual adjustment of said vanes to selected turned positions relative to said casing, top and bottom pairs of vanes being respectively sized and shaped for closure of the respective top and bottom openings of said casing in one turned position of said vanes, the inner surface of each said vane being a reflecting surface, each said vane being adjustable from its closure position away from said light sources so that it only partially overlies the respective opening of the casing, so as to permit control of the amount and direction of light emitted through the portion of the opening controlled thereby by regulation of the turned position of said vane.

References Cited in the file of this patent

UNITED STATES PATENTS

| | | |
|---|---|---|
| Re. 8,591 | Kelley | Feb. 18, 1879 |
| 963,912 | Lyhne | July 12, 1910 |
| 1,035,624 | McGhee | Aug. 13, 1912 |
| 1,167,451 | Walker | Jan. 11, 1916 |
| 1,169,853 | Menssen | Feb. 1, 1916 |
| 1,413,439 | Wempner | Apr. 18, 1922 |
| 1,472,050 | Curtis | Oct. 30, 1923 |
| 2,012,413 | Winkler | Aug. 27, 1935 |
| 2,439,330 | Zander | Apr. 6, 1948 |
| 2,440,938 | Falge | May 4, 1948 |